United States Patent [19]
Tomiyori

[11] Patent Number: 5,475,324
[45] Date of Patent: Dec. 12, 1995

[54] CLOCK GENERATOR WITH AN AUTOMATIC FREQUENCY CHANGE FUNCTION

[75] Inventor: Yutaka Tomiyori, Tokyo, Japan

[73] Assignee: NEC Corporation, Tokyo, Japan

[21] Appl. No.: 27,990

[22] Filed: Mar. 8, 1993

[30] Foreign Application Priority Data

Mar. 11, 1992 [JP] Japan .................................. 4-052360

[51] Int. Cl.$^6$ ...................................... H03K 3/00
[52] U.S. Cl. ............................ 327/145; 327/99; 327/292
[58] Field of Search ................................. 307/269, 260, 307/219; 328/104, 137, 154; 331/49, 55

[56] References Cited

U.S. PATENT DOCUMENTS

| | | | |
|---|---|---|---|
| 3,271,588 | 9/1966 | Minc | 328/154 |
| 3,708,686 | 1/1973 | Britle et al. | 331/49 |
| 4,686,386 | 8/1987 | Tadao | 302/269 |
| 4,816,776 | 3/1989 | Kessler | 331/49 |
| 4,949,052 | 8/1990 | Chigira | 331/49 |
| 5,086,387 | 2/1992 | Arroyo et al. | 302/269 |
| 5,227,672 | 7/1993 | Sawtell | 302/269 |
| 5,231,389 | 7/1993 | Yamauchi | 331/49 |

Primary Examiner—Timothy P. Callahan
Assistant Examiner—Dinh T. Le
Attorney, Agent, or Firm—Sughrue, Mion, Zinn, Macpeak & Seas

[57] ABSTRACT

If, in a clock generator according to the present invention, the first clock is switched to the second clock with a lower frequency, the frequency count circuit counts the frequency of the second clock with using the first clock as reference. The clock switching control means judges whether the frequency of the second clock is stable or not based on the count result from said frequency count circuit and, if it is stable, switches the switching means for clock switching to the second clock.

6 Claims, 4 Drawing Sheets

CLOCK GENERATOR WITH AN AUTOMATIC FREQUENCY CHANGE FUNCTION

BACKGROUNDS OF THE INVENTION

1. Field of the Invention

The present invention relates to a clock generator used in a logic circuit which operates with switching between two clocks having different frequencies.

2. Description of the Prior Art

A conventional logic circuit system utilizes high frequency clock (first clock) and low frequency clock (second clock) for the purpose of lower current consumption at the circuit. Specifically, the first clock with higher frequency is used when rapid operation is required and the second clock with lower frequency is used for lower speed operation with lower power consumption when rapid processing is not necessary. Such switching between the clocks saves power consumption.

In such a logic circuit system, sufficiently stable oscillation or stable frequency is required at the second clock when the system switches from the operation using the first clock to the operation using the second clock. For this, when switching from the first clock to the second clock, the timer controlling the first clock currently in operation keeps certain time after the start of oscillation at the second clock so as to wait for the second clock oscillation to become stable before actual switching to the second clock.

FIG. 4 is a timing chart for conventional clock switching. In the figure, (a) represents the oscillation of the first clock (CLK1), (b) represents the oscillation of the second clock (CLK2) and (c) is the clock switching signal. When this clock switching signal changes from H (high level) to L (low level), the system clock switches from the first clock to the second clock.

Referring to the timing chart in FIG. 4, the logical circuit system is operating according to the first clock generated by a clock generation circuit at the time T0, with the other clock generation circuit for the second clock terminated. A clock control circuit controls so that clock switching starts at the time T1 with causing the second clock to start oscillation. Thus started second clock oscillation becomes sufficiently stable at the time T2. The clock control circuit is in advance given a time (T3-T1), which takes into account the time (T2-T1) for stabilization of the second clock oscillation. The clock control circuit activates the timer at the time T1 to keep time and makes the switch signal to the low level at the time T3 so as to switch the system clock to the second clock. Then, after a certain period, the clock control circuit starts termination operation of the first clock at the time T4 and completely stops the first clock at the time T5. Thereafter, the logical circuit operates according to the second clock until the next clock switching.

In this series of operations, the time (T3-T1) from the start of oscillation at the second clock until the switching of the system clock to the second clock is set considering various environmental conditions in circuit designing stage. This is because the time until stabilization varies depending on environmental conditions such as oscillation start characteristics of the oscillation and the temperature, in case of the second clock with a lower frequency. If a timer keeps a certain time for clock switching as described above, the switching time is set more than the time actually required from oscillation start until the stabilization of the oscillation after consideration of various conditions.

However, oscillation stabilization time (T2-T1) of an oscillation circuit using a crystal oscillator commonly used in conventional systems vary depending on oscillator, degradation in time and current temperature conditions ranging from some milliseconds to some seconds. For an oscillation circuit generating low frequency clock, in particular, the time from oscillation start to frequency stabilization fluctuates quite largely. For example, in the case of an oscillation circuit which generates a clock with a frequency of about 32 kHz, it usually requires only a couple of seconds but sometimes can require some dozens of seconds at the worst depending on the environmental conditions. Therefore, it is difficult to set a uniform time period for all oscillation circuits manufactured in mass-production, for the time kept at the time of switching. It is also difficult to properly set a switching time for an oscillation circuit to ensure proper clock switching operation under any environment.

This means that, when the timer keeps certain time and switches the system clock, the second clock frequency may not have reached stable status. Forced clock switching causes the system to operate according to instable clock, which may result in errors, getting out of control or stopping.

SUMMARY OF THE INVENTION

An object of the present invention is to provide a clock generator which ensures proper operation of a logical circuit system operating under the clock from the generator by executing clock switching only when the stability of the new clock is verified.

According to a preferred embodiment of the present invention to attain the above object, a clock generator comprises a plurality of clock generation means to generate a plurality of clocks having different frequencies, a clock switching means to selectively output one of the plurality of clocks, and a clock switching control means which, in switching from the current clock to the other clock with a different frequency, judges whether the frequency of the new clock is stable or not and, if it is stable, controls the switching means for clock switching.

According to a further preferred embodiment of the present invention, a clock generator further comprises a frequency count means which counts the frequency of the new clock with using the current clock as the reference and outputs the counted frequency data to the clock switching control means.

According to another preferred embodiment of the present invention, the clock switching control means, during clock switching processing, oscillates the clock generation means for the new clock, obtains the frequency of the new clock counted by the frequency count means at certain timing, judges whether the frequency of the new clock is stable or not, switches the switching means to the new clock when the frequency is stable and terminates the current clock generation means after completion of switching.

According to still another preferred embodiment of the present invention, the clock switching control means stores a predetermined frequency range where the new clock can be considered stable and judges whether the frequency from the frequency counter is in the stored frequency range.

According to another preferred embodiment of the present invention to attain the above object, a clock generator comprises a first clock generation means to generate a first clock, a second clock generation means to generate a second clock having a frequency different from that of the first clock, a clock switching means to selectively output either of the first or second clock, a frequency count means to count the frequency of the second clock with using the first clock as reference, and a clock switching control means which, in switching from the first clock to the second clock, judges whether the frequency of the second clock is stable or not based on the count result from the frequency count means and switches the switching means when the frequency is stable.

According to a further preferred embodiment, the clock switching control means, during switching from the first clock to the second clock, oscillates the clock generation means for the second clock, obtains the second clock frequency counted by the frequency count means at certain timing, judges whether the frequency of the second clock is stable or not, switches the switching means to the second clock when the frequency of the second clock is stable and terminates the first clock generation means after completion of switching by the switching means.

According to a still further preferred embodiment, the clock switching control means stores a predetermined frequency range where the second clock can be considered stable and judges whether the frequency sent from the frequency counter is in the stored frequency range.

Other objects, characteristics and effects of the present invention will be clarified in the description in detail below.

DESCRIPTION OF THE PREFERRED EMBODIMENT

Figure 1:
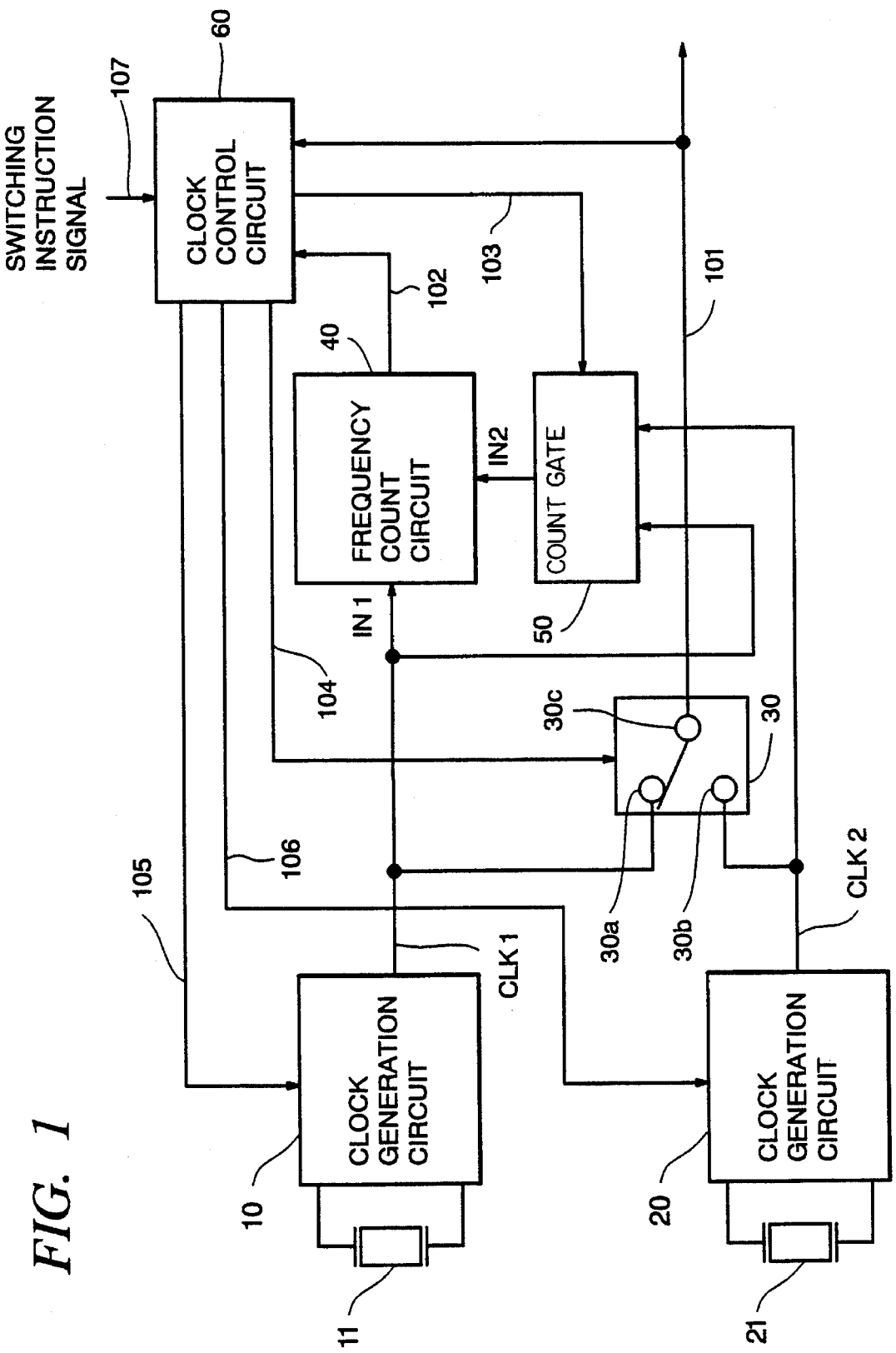
FIG. 1 is a block diagram to show the configuration of a preferred embodiment of a clock generator according to the present invention.

Referring to the attached figures, a preferred embodiment of the present invention will be described in detail below. FIG. 1 shows the configuration of a clock generator of the present invention according to a preferred embodiment.

In the figure, a clock generator comprises clock generation circuits 10 and 20, a clock switching circuit 30, a frequency count circuit 40, a count gate 50 and a clock control circuit 60.

A clock generation circuit 10 is provided with an oscillation device 11 such as a crystal oscillator and upon receipt of the oscillation frequency from the oscillation device 11, generates a rapid first clock (CLK1). The other clock generation circuit 20 is similarly provided with an oscillation device 21 such as a crystal oscillator and generates a second clock (CLK2) with a frequency lower than that of the first clock (CLK1) upon receipt of the oscillation frequency from the oscillation device 21. In this embodiment, the frequency of the first clock (CLK1) is set at about 4 MHz and that of the second clock (CLK2) at about 32 kHz for example.

The clock generator of this embodiment selectively switches the system clock between the first clock (CLK1) and the second clock (CLK2) so as to supply a clock signal to a logical circuit (not shown). The generator supplies the first clock with a high frequency when the logical circuit requires to be rapidly operated, and supplies the second clock with a low frequency when such a rapid operation is not required at the circuit; the generator thereby reduces the power consumption.

The clock switching circuit 30 comprises a switch having two fixed contacts 30a and 30b and a movable contact 30c. The first clock (CLK1) output from the clock generation circuit 10 is supplied to the fixed contact 30a. The second clock (CLK2) output from the clock generation circuit 20 is supplied to the fixed contact 30b. Connection with the movable contact 30c is selectively switched between the fixed contact 30a and the fixed contact 30b under control by the clock control circuit 60. From this movable contact 30c, either the first (CLK1) or the second clock (CLK2) is sent to the logical circuit (not shown) as the system clock 101.

The frequency count circuit 40 counts the frequency of the second clock (CLK2) with using the first clock (CLK1) as reference. To one of the inputs IN1 at the frequency count circuit 40, the first clock (CLK1) from the clock generation circuit 10 is supplied. The frequency count circuit is operated according to the first clock (CLK1) given to the input IN1. To the other input IN2 at the frequency count circuit 40, the output from the count gate 50 is supplied.

The count gate 50 receives the first clock (CLK1) and the second clock (CLK2). The count gate 50 opens and closes with certain time intervals according to a gate control signal 103 from the clock control circuit 60. The gate opens when the gate control signal 103 is at the high level and closes when it is at the low level. The period when the count gate 50 is open, or the gate control signal 103 is at the high level is set for a length corresponding to a half of the second clock cycle. The frequency count circuit 40 counts the first clock given through the count gate 50 while a half cycle period of the second clock, and thereby determines the frequency of the second clock (CLK2). The frequency data of the second clock determined by the frequency count circuit 40 is supplied to the clock control circuit 60 as a frequency count signal 102.

Since the frequency count circuit 40 thus counts the frequency of the second clock with using the first clock as reference, it is not necessary to provide an exclusive circuit to generate a reference clock for counting of the second clock frequency. This realizes a simpler circuit configuration than a case where an oscillation circuit for frequency counting is provided.

The clock control circuit 60 operates according to the system clock 101 output from the clock switching circuit 30. It controls turning on and off of the clock generation circuits 10 and 20 according to the clock switching instruction signal 107 and controls the clock switching circuit 30 based on the frequency data sent from the frequency count circuit 40.

The clock control circuit 60 judges whether the oscillation of the second clock (CLK2) is stable or not based on the frequency count signal 102 sent from the frequency count circuit 40. Specifically, the clock control circuit 60 stores a predetermined range of frequencies where the oscillation status of the second clock (CLK2) can be considered stable (reference frequency range). The reference frequency range is defined, for example, by the upper and the lower limits of the frequency. The clock control circuit 60 compares the frequency of the second clock (CLK2) sent from the frequency count circuit 40 with the reference frequency range given in advance. If the counted frequency is in the reference frequency range, it judges that the oscillation status of the second clock (CLK2) is stable and outputs a switching signal 104 to the clock switching circuit 30.

The clock control circuit 60 outputs driving control signals 105 and 106 to the clock generation circuit 10 and the other clock generation circuit 20. The driving control signals 105 and 106 cause the clock generation circuits 10 and 20 to start or stop clock oscillation.

Referring now to the flowchart of FIG. 2 and the timing chart of FIG. 3, the clock switching operation at the clock generator according to this embodiment is described below.

Figure 2:
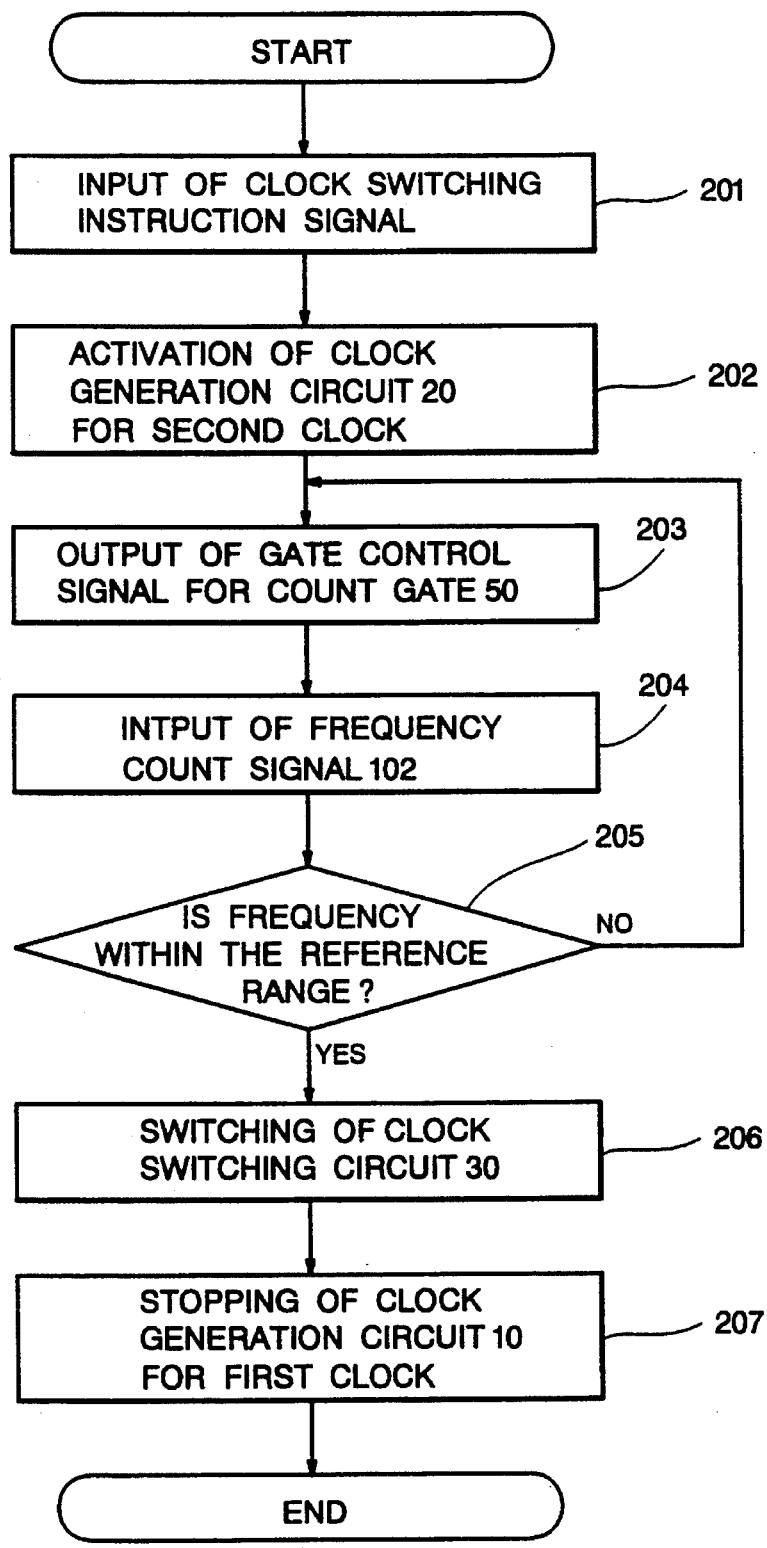
FIG. 2 is a flowchart to illustrate the control operation of a clock control circuit in the clock generator shown in FIG. 1.

FIG. 2 is a flowchart to show the control operation of the clock control circuit 60. FIG. 3 shows oscillation statuses of the first and the second clocks, gate control signal 103 at the count gate 50 and the switching signal 104 at the clock switching circuit 30.

Figure 3:
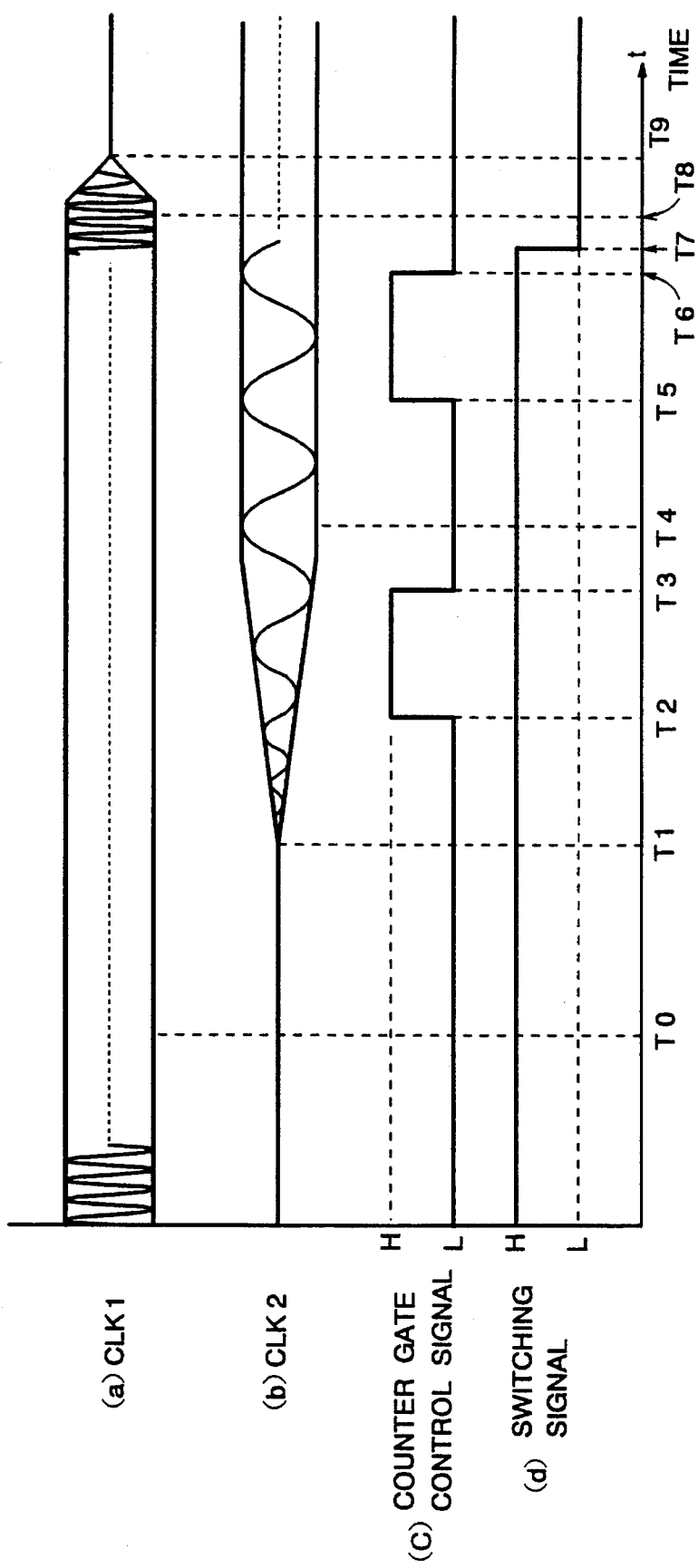
FIG. 3 is a timing chart to illustrate the clock switching operation of the clock generator shown in FIG. 1.
Figure 4:
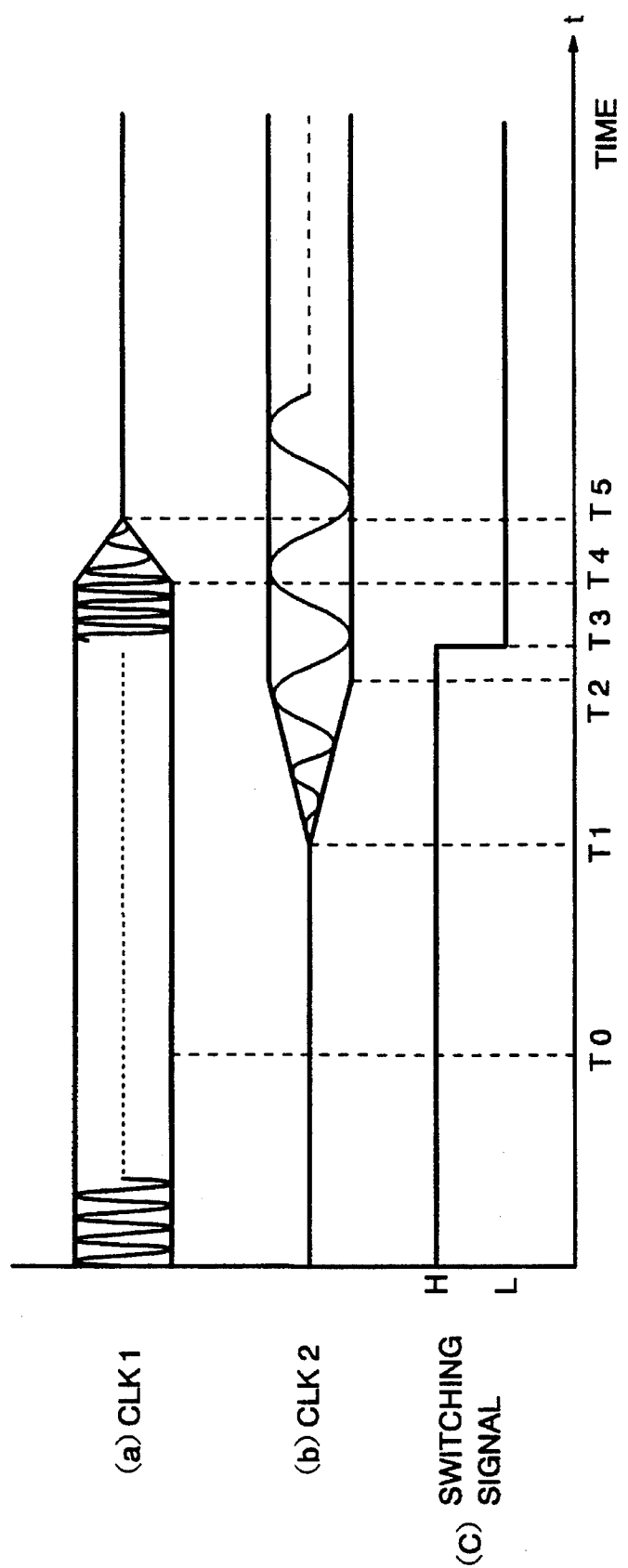
FIG. 4 is a timing chart to illustrate the clock switching operation of a conventional clock generator.

In FIG. 3, (a) shows the oscillation status of the first clock (CLK1) and (b) shows the oscillation status of the second clock (CLK2). FIG. 3 (c) shows the status of the gate control signal 103 to open or close the count gate 50. When the gate control signal 103 is at the high level "H", the count gate 50 is opened and outputs the first clock (CLK1) to the frequency count circuit 40 while the signal is at the high level (during a half cycle of the second clock). FIG. 3 (d) shows the switching signal 104 output from the clock control circuit 60 to the clock switching circuit 30. The first clock (CLK1) is selected when the switching signal 104 is at the high level (H) and the second clock (CLK2) is selected as the system clock when the signal is at the low level (L).

At the time T0, the clock generator supplies the first clock (CLK1) to the logical circuit and the second clock (CLK2) is stopped. Under such conditions, if the logical circuit inputs the switching instruction signal to instruct the clock control circuit 60 to switch the system clock from the first clock (CLK1) to the second clock (CLK2) (Step 201), the clock control circuit 60 sends the driving control signal 106 to the clock generation circuit 20 and thereby turns on the clock generation circuit 20 (Step 202). This causes the clock generation circuit 20 to start oscillation of the second clock (CLK2) at the time T1.

Then, the clock control circuit 60 outputs the gate control signal 103 at the time T2 to raise the count gate 50 to the high level until the time T3 (Step 203). The period from the time T2 to the time T3 where the count gate 50 is open corresponds to a half cycle of the second clock (CLK2) as described above. This causes that the first clock (CLK1) to be supplied from the clock generation circuit 20 via the count gate 50 to the frequency count circuit 40 from the time T2 to the time T3. The frequency count circuit 40 counts the input first clock (CLK1) and thereby determines the frequency of the second clock (CLK2) and sends the frequency count signal 102 to the clock control circuit 60.

The clock control circuit 60 receives the frequency count signal 102 from the frequency count circuit 40 (Step 204) and judges whether the frequency value is in the reference frequency range given in advance (Step 205).

In the example as shown in FIG. 3, since the second clock (CLK2) from the time T2 to the time T3 is not sufficiently stable, judgment is NO at Step 205. In this case, the system clock is not switched.

After a certain timer period, the clock control circuit 60 outputs the gate control signal 103 to the count gate 50 from the time T5 and the time T6 so as to open the count gate 50. The time from T5 to T6 is equivalent to the time from T2 to T3. The frequency count circuit 40 counts again the frequency of the second clock (CLK2) from the time T5 to the time T6 and sends the frequency count signal 102 to the clock control circuit 60.

The clock control circuit 60 receives the frequency data from the frequency count circuit 40 and judges whether the frequency data is in the range set in advance (Step 205).

If the frequency of the second clock (CLK2) is sufficiently stable and in the reference frequency range set in advance, the clock control circuit 60 judges that the second clock (CLK2) becomes sufficiently stable and outputs the switching signal 104 to instruct the clock switching circuit 30 to switch the system clock from the first clock to the second clock at the time T7 (Step 206). Thus, the clock switching circuit 30 moves the movable contact 30c toward the fixed contact 30b upon receipt of the switching signal 104 from the clock control circuit 60. Therefore, after the time T7, the second clock (CLK2) is output as the system clock 101. After the time T7, the clock control circuit 60 outputs the driving control signal 105 to the clock generation circuit 10 at the time T8 so as to start stopping process of the clock generation circuit 10 (Step 207). Then, the clock generation circuit 10 completely stops its operation at the time T9 after a certain period.

Thereafter, until the next clock switching (switching from the second clock to the first clock), the second clock (CLK2) is supplied as the system clock 101.

In the above embodiment, if the frequency counted between T5 and T6 is judged instable, then the frequency of the second clock is counted again after a certain time period. Until it is Judged stable by the clock control circuit 60, the frequency is repeatedly counted.

Thus, in switching of the system clock from the first clock to the second clock, the clock generator of this embodiment counts the frequency of the second clock with the frequency count circuit 40, and then has the clock control circuit 60 check whether the oscillation status of the second clock is stable or not based on that count result before actual clock switching. Therefore, even if the time required for initial stabilization of the second clock oscillation is prolonged due to temperature or other conditions, system clock with instable oscillation is prevented from being supplied to the logical circuit, which eliminates the risk of malfunction, getting out of control or stopping of the logical circuit.

Though switching from the first clock with a high frequency to the second clock with a low frequency has been described, this invention is also applicable to switching from the second clock to the first clock. Specifically, it is not until the frequency count circuit 40 counts the frequency of the first clock and judges that the frequency is stable that switching is made at the clock switching circuit 30. In practice, however, if the first clock has a sufficiently higher frequency, it becomes stable much sooner than the second clock with a lower frequency and it is not necessary to count the frequency to see whether it has become stable or not. Therefore, it is practical to adopt the conventional method for switching from the second clock to the first clock and execute switching to the first clock when a certain time has kept by the timer after oscillation of the first clock generation circuit 10.

Obviously, various modifications can be made to the above embodiments. It is intended to cover in the appended claims all such modifications and variations as fall within the true spirit and scope of the present invention.

What is claimed is:

1. A clock generator with frequency change function comprising:

a plurality of clock generation means for generating a plurality of clocks having different frequencies;

a clock switching means for selectively outputting a current clock, wherein said current clock is one of said plurality of clocks that is currently being output by said clock generator;

a frequency count means, connected to said plurality of clock generation means, for counting a frequency of a new clock to be output from said clock generator, wherein said new clock is one of said plurality of clocks that is not currently being output from said clock generator; and a clock switching control means, connected to said plurality of clock generation means, said clock switching means, and said frequency count means, for driving a new clock generation means, wherein said new clock generation means is one of said plurality of said clock generation means that generates said new clock, for determining whether said frequency of said new clock is stable or not on the basis of frequency counted by said frequency count means, for controlling said switching means to selectively output said new clock when said frequency of said new clock is stable, and for deactivating said current clock generation means after completion of switching, wherein said current clock generation means is one of said plurality of said clock generation means that generates said current clock.

2. A clock generator as set forth in claim 1, wherein said frequency count means counts said frequency of said new clock by using said current clock as a reference and outputs a counted frequency data signal to said clock switching control means, wherein said counted frequency data signal represents said frequency counted by said frequency count means.

3. A clock generator as set forth in claim 1, wherein said clock switching control means determines whether said frequency counted by said frequency count means is within a predetermined frequency range, wherein said predetermined frequency range is a frequency range within which said new clock is considered stable, and switches said switching means to said new clock when said counted frequency is within said predetermined frequency range.

4. A clock generator with frequency change function comprising:

a first clock generation means for generating a first clock;

a second clock generation means for generating a second clock having a frequency different from a frequency of said first clock;

a switching means for selectively outputting either of said first clock or said second clock;

a frequency count means, connected to said first clock generation means, and said second clock generation means, for counting said frequency of said second clock by using said frequency of said first clock as a reference; and a clock switching control means connected to said first clock generation means, said second clock generation means, said switching means, and said frequency count means, for driving said second clock generation means after receiving a switching instruction to switch from said first clock to said second clock, determining whether said frequency of said second clock is stable or not on the basis of counted frequency data from said frequency count means, switching said switching means to said second clock when said frequency of said second clock is stable, and deactivating said first clock generation means after completion of said switching.

5. A clock generator as set forth in claim 4, wherein said clock switching control means determines whether said counted frequency data from said frequency count means is within a predetermined frequency range, wherein said predetermined frequency range is a frequency range within which said second clock is considered stable, and switches said switching means to said second clock when said counted frequency data is within said predetermined frequency range.

6. A clock generator with frequency change function comprising:

a first clock generation means for generating a first clock having a high frequency;

a second clock generation means for generating a second clock having a frequency lower than said high frequency of said first clock;

a switching means for selectively outputting either of said first clock or said second clock;

a frequency count means, connected to said first clock generation means and said second clock generation means, for counting said frequency of said second clock by using said high frequency of said first clock as a reference; and a clock switching control means, connected to said first clock generation means, said second clock generation means, said switching mean, and said frequency count means, for driving said second clock generation means by receiving a switching instruction to switch from said first clock to said second clock, determining whether said frequency of said second clock is stable or not on the basis of counted frequency data from said frequency count means, switching said switching means to said second clock when said frequency of said second clock is stable, and deactivating said first clock generation means after completion of switching, wherein said clock switching control means determines whether said counted frequency data from said frequency count means is within a predetermined frequency range, wherein said predetermined frequency range is a frequency range within which said new clock is considered stable.

* * * * *